United States Patent [19]

Stilin

[11] Patent Number: 4,745,998
[45] Date of Patent: May 24, 1988

[54] DISENGAGEABLE FRICTION COUPLING FOR RELEASABLY JOINING AN ELEMENT ABOUT A SHAFT

[75] Inventor: John J. Stilin, Milwaukee, Wis.

[73] Assignee: The Falk Corporation, Milwaukee, Wis.

[21] Appl. No.: 917,530

[22] Filed: Oct. 9, 1986

[51] Int. Cl.[4] .............................................. F16D 13/14
[52] U.S. Cl. ...................................... 192/74; 192/86; 192/93 C; 403/297; 403/366
[58] Field of Search .................. 192/74, 76, 75, 85 C, 192/85 CA, 86, 34, 93 C, 65; 403/366, 297, 374

[56] References Cited

U.S. PATENT DOCUMENTS

| | | |
|---|---|---|
| 174,363 | 3/1896 | Holske . |
| 2,010,057 | 8/1935 | Buckwalter ............................ 295/36 |
| 2,093,281 | 9/1937 | Krueser ................................. 192/85 |
| 2,206,373 | 7/1940 | Stieber . |
| 2,293,085 | 8/1942 | Stieber ........................... 192/93 C X |
| 2,764,437 | 9/1956 | Bratt . |
| 3,358,772 | 12/1967 | Bunyan ............................... 170/173 |
| 3,753,478 | 8/1973 | Shiber ............................ 192/85 AA |
| 3,795,294 | 3/1974 | Pearson .......................... 192/85 AT |
| 3,803,691 | 4/1974 | Geese et al. ........................... 29/200 |
| 3,835,971 | 9/1974 | Spanke et al. ....................... 192/18 A |
| 3,924,978 | 12/1975 | Loyd, Jr. et al. ...................... 418/60 |
| 4,067,425 | 1/1978 | Soter ................................. 192/91 A |
| 4,287,785 | 9/1981 | Hunt ............................... 188/343 X |
| 4,310,260 | 1/1982 | Katayama ............................... 403/7 |
| 4,418,582 | 12/1983 | Martin ............................. 403/374 X |
| 4,440,278 | 4/1984 | Weber ............................... 192/18 R |

FOREIGN PATENT DOCUMENTS 2026650 2/1980 United Kingdom .

Primary Examiner—Rodney H. Bonck
Attorney, Agent, or Firm—Quarles & Brady

[57] ABSTRACT

A disengageable friction coupling is comprised of a hollow shaft having a tapered inner surface. An element defining an internal opening is mounted over the hollow shaft, the hollow shaft having a tapered inner surface in the region of said element. A plug is located inside the hollow shaft in the region of the element. The plug has a tapered outer surface which mates with the tapered inner surface of the hollow shaft. The tangent of the angle of taper is less than the coefficient of static friction between the mating surfaces of the plug and the shaft. A double-acting ram is mounted on the shaft and on the plug so that, when the ram drives in one direction, it presses the plug into the shaft so as to substantially elastically deform the shaft radially outward for frictional engagement with the element, and, when the ram drives in the opposite direction, it pulls the plug outward, allowing the shaft to return substantially to its normal, unstressed shape, and thereby releases the shaft from frictional engagement with the element.

4 Claims, 1 Drawing Sheet

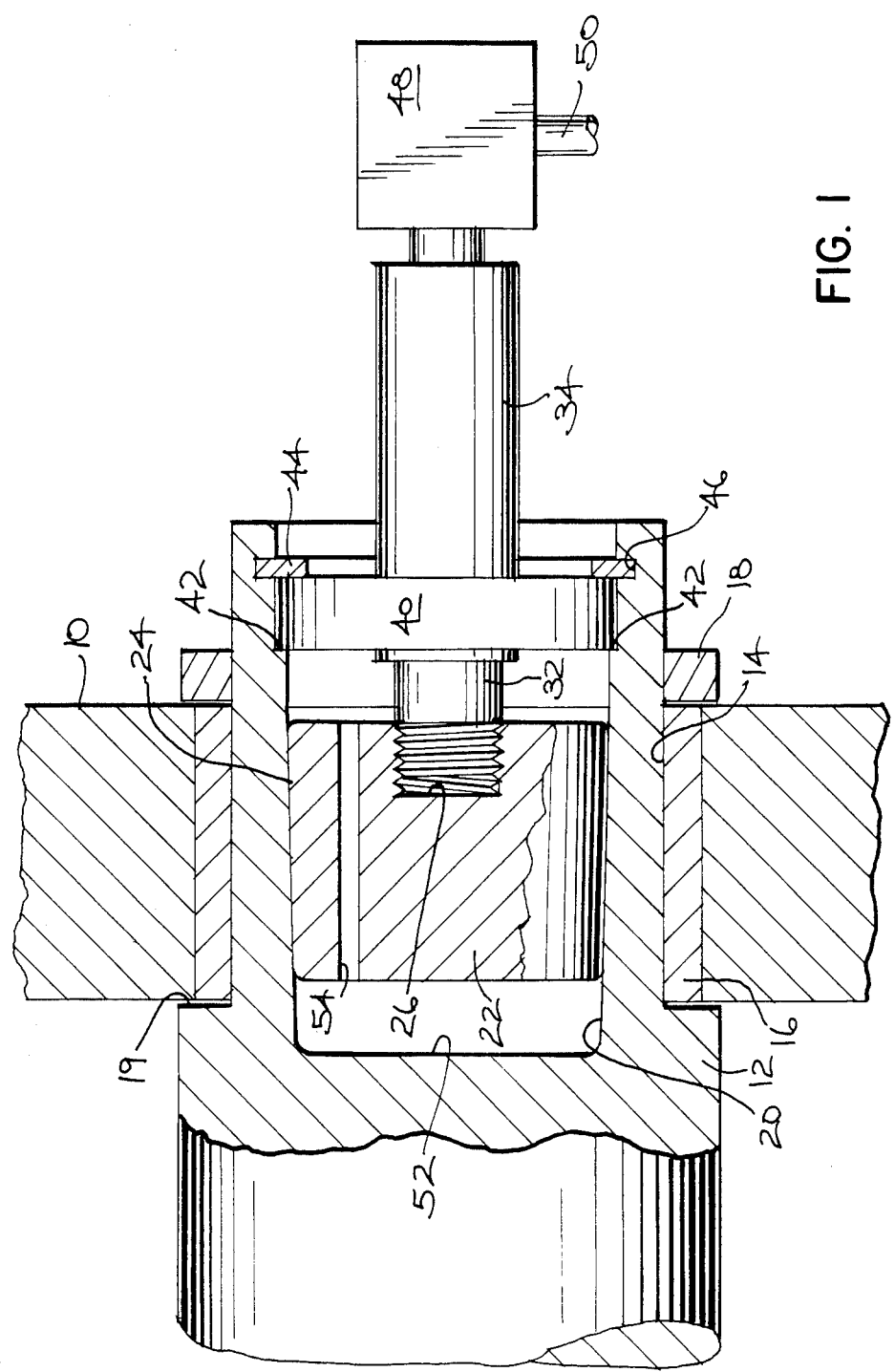

4,745,998

DISENGAGEABLE FRICTION COUPLING FOR RELEASABLY JOINING AN ELEMENT ABOUT A SHAFT

BACKGROUND OF THE INVENTION

This invention relates to a disengageable friction coupling for mounting an element on a shaft. It is intended to be used in a clutch or a brake mechanism.

Most clutch/brake mechanisms are very complicated, having a large number of parts, many of which are movable. A typical approach uses pads of friction material (U.S. Pat. No. 4,440,278 issued Apr. 3, 1984 to H. Weber for "Clutch and Brake Device for Presses, Punches and the Like") that are engaged or disengaged by axial movement under fluid pressure to contact rotating or stationary elements. Another approach exemplified by U.S. Pat. No. 3,835,971 issued Sept. 17, 1974 to E. A. Spanke, et al. for "Fluid Operated Clutch and Brake" uses interleaved wet plates that are alternately engaged and disengaged by axial movement of operating elements. The axial movement to engage or disengage the pads or discs is usually provided by hydraulic or pneumatic driven pistons incorporated into the clutch/brake mechanism.

These mechanisms are difficult to assemble and disassemble, and the presence of a large number of moving parts provides many points at which failure can occur. The mechanisms also typically require the continuous application of fluid pressure to maintain an engaged or disengaged attitude.

SUMMARY OF THE INVENTION

The present invention is a very simple disengageable friction coupling with very few parts. Due to the simplicity of the present invention, assembly and disassembly of the mechanism are easy and can easily be performed in the field. Few spare parts are required, and there are very few points at which the mechanism can fail. The friction coupling can function either as a clutch or a brake. Once engaged or disengaged, fluid pressure is not required to maintain the respective condition.

The present invention provides a disengageable friction coupling which includes a hollow shaft and an element defining an internal opening which is mounted over the hollow shaft, the opening having a diameter slightly larger than the outer diameter of the hollow shaft when the shaft is in its normal, undeformed state. The hollow shaft has a tapered inner surface in the region of the element. A plug is located inside the hollow shaft in the region of the element, the plug having a tapered outer surface adapted to mate with the tapered inner surface of the hollow shaft. The invention also includes a two-directional driver operatively connected to the plug so that, when the driver drives in one direction, it presses the plug into the shaft so as to substantially elastically deform the shaft radially outward for frictional engagement with the element, and, when the driver drives in the opposite direction, it releases the plug from engagement with the shaft, allowing the shaft to return substantially to its normal, unstressed shape, thereby releasing the shaft from frictional engagement with the element.

In the preferred embodiment, the driver is a double acting hydraulic or pneumatic ram which has its cylinder mounted into the hollow shaft and its piston rod attached to the plug. The degree of taper on the mating tapered surfaces of the shaft and plug is such that the plug will remain engaged with the shaft even after the fluid pressure to the ram is removed. The shaft is preferably hollow only adjacent the portion which mounts the element so that the plug operates in a pocket within the shaft. The plug is solid except for a small through hole which functions as an orifice to regulate the rate at which the plug is engaged and disengaged. The surface of the element in contact with the shaft may be provided with a special coating or face of a material that is specially adapted to withstand the heat generated or to eliminate lubrication concerns.

The element mounted on the shaft may be a gear, in which case the friction coupling may operate as a clutch mechanism between the gear and the shaft. Alternatively, the element may be a stationary member, in which case the friction coupling may serve to brake the shaft.

BRIEF DESCRIPTION OF THE DRAWING

FIG. 1 is a side sectional view of an assembled friction coupling, made in accordance with the present invention.

DETAILED DESCRIPTION OF THE PREFERRED EMBODIMENT

FIG. 1 shows an element 10, which may be a stationary brake member or a gear or other element to be mounted on a hollow shaft 12. The element 10 has a cylindrical opening 14 which has a diameter slightly larger than the outside diameter of a hollow shaft 12 in the region of the element 10, when the hollow shaft 12 is in its normal, undeformed shape. As shown in FIG. 1, the element 10 may include a coating or liner 16 on its inner surface which is made of a special material to withstand heat or which has certain lubrication characteristics, such as a sintered metal, ceramic, or matrix material. Alternatively, the element 10 could be continuous, with its inner surface 14 being made of the same material as the rest of the element 10.

In order to install the element 10 on the shaft, the element 10 is simply slid onto the shaft from right to left. At this point, the element 10 slides easily over the shaft 12, because the shaft is undeformed. A keeper ring or collar 18 is installed on the shaft behind the element 10 and the element 10 is axially restrained between the collar 18 and a shoulder 19 formed on the outer surface of the shaft 12.

The shaft 12 is made of other ductile material. The shaft 12 has an internal surface portion 20 which is slightly tapered, having a larger inside diameter at its outer edge and becoming smaller moving inward (to the left in the drawing). A plug 22 has a frustro-conical outer surface 24 which is tapered at approximately the same angle as the taper of the inner surface 20 of the shaft 12, so that the internal surface 20 of the shaft 12 and the outer surface 24 of the plug 22 mate with each other. The angle of the taper on the inner surface 20 of the hollow shaft 12 and the angle of taper on the outer surface 24 of the plug 22 are approximately the same and are very slight, typically less than five degrees off of the axis of rotation of the shaft. The angle of the taper is designed so that the tangent of that angle is less than the coefficient of static friction between the materials of the shaft 12 and the plug 22 and any lubricant between the two.

The plug 22 includes a central cylindrical recess 26 at is outer, large diameter end. The recess 26 receives the end of the piston rod 32 of a double acting hydraulic arm 34 which is threaded into the plug 22.

The hydraulic ram 34 is also mounted to the shaft 12. A flange 40 is formed as a part of the main cylinder body of the hydraulic ram 34. The flange 40 is retained between a shoulder 42 on the shaft 12 and a snap ring 44 which fits into a groove 46 in the inner surface of the shaft. The hydraulic ram 34 is operated by means of hydraulic or pneumatic fluid entering and exiting through a rotary seal 48 connected to a source of fluid under pressure through a conduit 50. The hydraulic or pneumatic ram is a standard, double-acting ram, such as the model series 2H heavy duty hydraulic cylinder made by Parker-Fluid Power.

The piston rod 32 of the hydraulic ram 34 is first threaded into the plug 22. The rod 32 is fully retracted within the cylinder as the plug 22 is first inserted into the hollow portion of the shaft 12. As a result, there is no interference between the plug 22 and the shaft 12, and the shaft 12 is not deformed. The ram 34 is moved into position until the flange 40 on the ram 34 abuts the shoulder 42 on the inner surface of the shaft 12. The snap ring 44 is inserted into the groove 46 to hold the hydraulic ram 34 in position. At this point, the element 10 is still free to move relative to the shaft 12, or, if the element 10 is fixed (as in a brake mechanism), the shaft 12 is free to move relative to the element 10.

When the hydraulic ram 34 is actuated to extend the rod 32, the plug 22 will be moved further into the shaft 12. The plug 22 will cause the shaft 12 to deform radially outward, thereby causing the shaft to frictionally engage the element 10 on the shaft 12. If the element 10 is a fixed element, the shaft 12 will be stopped by the element 10 acting as a brake. If the element 10 is a gear, the gear 10 will now be rotating with the shaft 12.

If an operator then reverses the ram 34 and piston rod 32, the plug 22 will move to the right, thereby releasing the shaft 12 and permitting the shaft 12 to return to its original, undeformed state. If the element 10 is a stationary member, the shaft 12 is now free to rotate. If the element 10 is a gear, the gear 10 is disengaged from the shaft 12.

The slight angle of taper at the mating surfaces of the shaft 12 and plug 22 helps insure that the friction between the shaft and the plug will keep the plug from slipping out of position once it is in place. Thus, it is not necessary that the ram remain pressurized to hold the plug in the engaged position. Friction between the shaft and plug will hold the plug from withdrawing when the pressure is released. Similarly, after the plug 22 is withdrawn from the shaft 12, the ram need not remain pressurized to keep the coupling disengaged. This can be very beneficial where long-term engagement or disengagement is necessary with resultant cost savings realized from the non-operating hydraulic system. This slight angle also facilitates insertion of the plug 22 into the shaft 12, so that the respective surfaces of the shaft and the plug act as a slight incline or ramp along which the plug 22 travels in order to expand the shaft 12 in the region of the element 10.

When the plug 22 deforms the shaft 12 radially outward, the deformation is essentially elastic, "Elastic deformation" means that the shaft is not stressed beyond its elastic limit, so that it returns to its original shape as soon as the plug 22 is released from engagement with the shaft 12. This is contrasted with plastic deformation, in which some permanent deformation takes place. If the shaft undergoes plastic deformation, it will not return to its original shape when the plug 22 is removed. In the first engagement of the plug 22 with the shaft 12, the elastic limit may be purposely exceeded so that the mating surfaces of the elements are permanently deformed to remove any surface irregularities. The elastic limit should not be exceeded on subsequent operation. Such initial permanent deformation is included with the term "substantially elastic deformation" as used herein.

The amount of elastic deformation is controllable by controlling the fluid pressure to the ram. This is particularly advantageous to insure that neither the shaft 12 nor the element 10, nor any other elements in the mechanical train, are subjected to deformation beyond substantially elastic deformation. It also permits control of the gripping force between the shaft 12 and the element 10 to allow for relative movement between the two in case of overload on the element 10.

An antifriction compound, such as an oil or grease containing molybdenum disulfide, may be applied to the inner surface of the shaft 12 or to the outer surface of the plug 22 before insertion of the plug 22 in order to reduce friction of the materials as they pass over each other. A suitable lubricant to reduce friction between the element 10 and the shaft 12 during non-engaged or free-wheeling operation is required. The lubricant used and the quantity supplied, either by splash or pressure, will depend on the relative sliding speed between the element 10 and the shaft 12. The lubricant also provides cooling to the rubbing interface during freewheeling. Suitable lubricants may include natural or synthetic oils conforming to specifications of AGMA or SAE.

The length of the plug 22 can be less than, equal to, or greater than the length of the element 10. The variation of length is a design choice selected to minimize the stresses around the edges of the element 10 and the adjacent appendages to the assembly such as flanges or shoulders.

The shaft 12 may be hollow throughout its length. Preferably, however, the shaft 12 is hollow only in the area occupied by the plug 22 and ram 34 so that the shaft forms a wall 52 that defines a chamber or pocket within the shaft. The plug 22 is solid except for a small through hole 54. The hole 54 will function as an orifice to moderate the engagement and disengagement of the plug 22 with the shaft 12. As the plug 22 is forced inwardly, its movement will be resisted by air trapped between the end wall 52 and the plug 22, but the air will bleed through the hole 54 at a controlled rate to cushion the engagement of the element 10 with the shaft 12. Similarly, when the plug 22 is withdrawn, its movement will be resisted by a partial vacuum created between the end wall 52 and the plug 22 as air slowly reenters through the hole 54.

What is claimed is:

1. A disengageable friction coupling, comprising:
   a hollow shaft of ductile material and defining a continuous tapered inner surface;
   an element defining an internal opening which is mounted about said hollow shaft in the region of said tapered inner surface, the opening having a diameter slightly larger than the outer diameter of said hollow shaft when said hollow shaft is in its normal, undeformed state;
   a plug located inside said hollow shaft in the region of said element, said plug having a tapered outer surface adapted to mate with the tapered inner surface of said hollow shaft; and a double acting ram connected to said plug and mounted to said shaft such that, when said driver drives in one direction, it presses said plug into said shaft so as to substantially elastically deform said shaft radially outward for frictional engagement with said element, and, when said driver drives in the other direction, it pulls said plug outward, allowing said shaft to return substantially to its normal, unstressed shape, releasing said shaft from frictional engagement with said element, said driver being nonrotatable with respect to said plug as the driver drives in both directions.

2. A disengageable friction coupling as set forth in claim 1 wherein said ram has a piston rod connected to said plug and a cylinder body mounted on the shaft.

3. A disengageable friction coupling, comprising:

a shaft having a hollow portion terminating in an end wall, said hollow portion including a continuous tapered inner surface, and said shaft being formed of a ductile material;

an element defining an internal opening which is mounted about said hollow shaft in the region of said tapered inner surface, the opening having a diameter slightly larger than the outer diameter of said shaft when said shaft is in its normal, undeformed state;

a plug located inside said hollow portion of said shaft in the region of said element, said plug having a tapered outer surface adapted to mate with the tapered inner surface of said shaft; and a two-directional driver connected to said plug and mounted to said shaft such that, when said driver drives in one direction, it presses said plug into said shaft so as to substantially elastically deform said shaft radially outward for frictional engagement with said element, and, when said driver drives in the other direction, it pulls said plug outward, allowing said shaft to return substantially to its normal, unstressed shape, releasing said shaft from frictional engagement with said element, said driver being non-rotatable with respect to said plug as the driver drives in both directions, said plug being solid except for a through hole that acts as an orifice leading to the space between the plug and the end wall.

4. A disengageable friction coupling as set forth in claim 3, wherein the tangent of the angle of taper of the plug and shaft is less than the coefficient of static friction between the mating surfaces of the plug and shaft.

* * * * *